3,392,775
PROCESS FOR AVOIDING LOCAL COOLING OF STEEL IN CONTINUOUS CASTING EQUIPMENT
Horst Karl Lotz, Frankfurt am Main, Germany, assignor to Messer Griesheim GmbH, a corporation of Germany
No Drawing. Filed July 13, 1965, Ser. No. 471,709
2 Claims. (Cl. 164—82)

ABSTRACT OF THE DISCLOSURE

A process for avoiding local cooling of cast steel workpieces which would result from contact with the underlying supports moved in the direction of the workpiece wherein the supports are spaced from each other in the cutting range of the casting equipment, includes moving the supports which are located between the casting means and the cutting means in the immediate vicinity thereof at speeds which change at certain time intervals by being selectively faster and slower than the workpiece speeds so that the total of the relative speeds of the supports with respect to the workpiece is about equal to zero.

---

The invention relates to a process for the avoidance of local cooling of cast elongated members or ingots such as rods, bars, etc. when contacted by their supports which are disposed under them, in the cutting area of a continuous casting installation.

Elongated cast members are cut to the desired length by providing spaced supports under the members and then cutting the members at a location between the supports.

The use of these supports runs into considerable difficulties in connection with crack-sensitive steel. In most cases there is relative movement between the support and workpiece by moving the workpiece over stationary supports. A recent development, however, is described in U.S. Patent 3,322,418, issued May 30, 1967. During the cutoff process of that patent there is no relative movement at the steel rod or workpiece between the underlying support and the workpiece. This produces a sharp cooling off of the workpiece at the places where during this time the workpiece and its support are touching thereby resulting in the workpiece becoming brittle and causing an undesired crack-formation of the workpiece.

An object of this invention is to eliminate these deficiencies in the most simple and advantageous manner.

In accordance with this invention this object is achieved by moving the supports at a differing speed as compared with the speed of the workpiece. This enlarges the small local contact points between workpiece and support during an absolute synchronous run to long contact points when the workpiece and support move at the same speed thus shortening the contact duration of two points of the workpiece and of the support. Accordingly, the cooling off of the workpiece is extended to a larger surface with a weaker cooling effect as a result of the time factor. In doing so, the support can be moved with a speed which is either greater than the speed of the workpiece or which is somewhat slower than the speed of the workpiece or by changing somewhat more than or less than the speed of the workpiece.

In the inventive process there results, because of the changing decrase or increase of the support speed corresponding to the workpiece movement, alternating positive or negative relative speeds whose total is about equal to zero. For example, if the supports are moved for a duration of time at a certain value slower than the speed of the workpiece, the supports are then moved for an equal time duration at a speed which is faster by that same amount. The total relative speed of the supports and workpiece for the total time duration is thus zero. This advantageously avoids contacting of support and workpiece for a certain duration of time only at certain places. The contact that does occur is divided, according to the inventive process, to a larger workpiece length with considerably slighter cooling of the workpiece by dissipation of heat to the supporting parts touching it. Since this movement is limited, if the overhead workpiece torch is synchronized to move with the workpiece, a synchronized movement of the support permits the cutting torch to remain in the area of the support prescribed for it, e.g. the space between two rollers of a supporting roller chain.

The supports are, for example, in the form of rollers which are rotated in the same direction as the oncoming workpiece travelling on the supports. A cutting torch is disposed above the workpiece and moves back and forth between spaced rollers. The torch moves forward at the same speed as the workpiece and, during this forward movement, the torch is simultaneously cutting a workpiece segment. The cutting operation is completed by the end of the forward movement of the torch, and the torch returns to its original position to begin another cutting operation.

In the advantageous further development of the invention it is recommended to choose the speed ratios for the workpiece, its support and the cutting device or torch in such a manner that the torch does not leave a certain area in relation to the support. The desired uneven synchronized speed is effectively produced by mounting machine elements in the synchronous drive which bring about the desired speed variations, as for instance reduction of speed and transmission drives, eccentrically supported chain wheels, or pneumatic, mechanical or kinetic switching devices which are built into the drive system for the track support together with the actual synchronous movement.

Obviously, many modifications and variations of the present invention are possible in light of the above teachings. It is therefore to be understood that within the scope of the appended claims the invention may be practiced otherwise than as specifically described.

What is claimed is:
1. A process for the avoidance of local cooling of cast steel workpieces as a result of contact with the underlying supports which are arranged at a distance from each other in the cutting range of steel-continuous casting equipment, the supports between the casting means and the cutting means in the immediate vicinity thereof being moved at a differing speed as compared with the speed of the workpiece and the speed of the supports being synchronized with respect to the speed of the cutting means to maintain the cutting means in a free area of the supports, characterized in that said supports between the casting means and the cutting means being moved with speeds changing at certain time intervals, which are selectively faster and slower than the workpiece speeds, whereby the total of the relative speeds of said supports to the workpiece is about equal to zero.

2. A process for the avoidance of local cooling of cast steel workpieces as a result of contact with the underlying supports which are moved in the direction of the moving workpiece and which are arranged at a distance from each other in the cutting range of steel-continuous casting equipment, the supports being moved at a differing speed as compared with the speed of the workpiece and the speed of the supports being synchronized with respect to the speed of the cutting means to maintain the cutting means in a free area of the supports, characterized in that the supports located between the casting means and the cutting means and in the immediate vicinity thereof are moved with speeds changing at certain time intervals, which are selectively faster and slower than the workpiece speeds, whereby the total of the relative speeds of the supports to the workpiece is about equal to zero.

References Cited

UNITED STATES PATENTS

| | | | |
|---|---|---|---|
| 2,806,263 | 9/1957 | Hogan | 164—263 |
| 2,971,414 | 2/1961 | Owen | 83—110 X |
| 3,322,418 | 5/1967 | Lotz | 266—23 |

JOHN F. CAMPBELL, *Primary Examiner.*

R. F. DROPKIN, *Assistant Examiner.*